June 7, 1932. H. E. CURTIS 1,861,909
POWER TRANSMISSION MECHANISM
Filed April 9, 1930 2 Sheets-Sheet 1
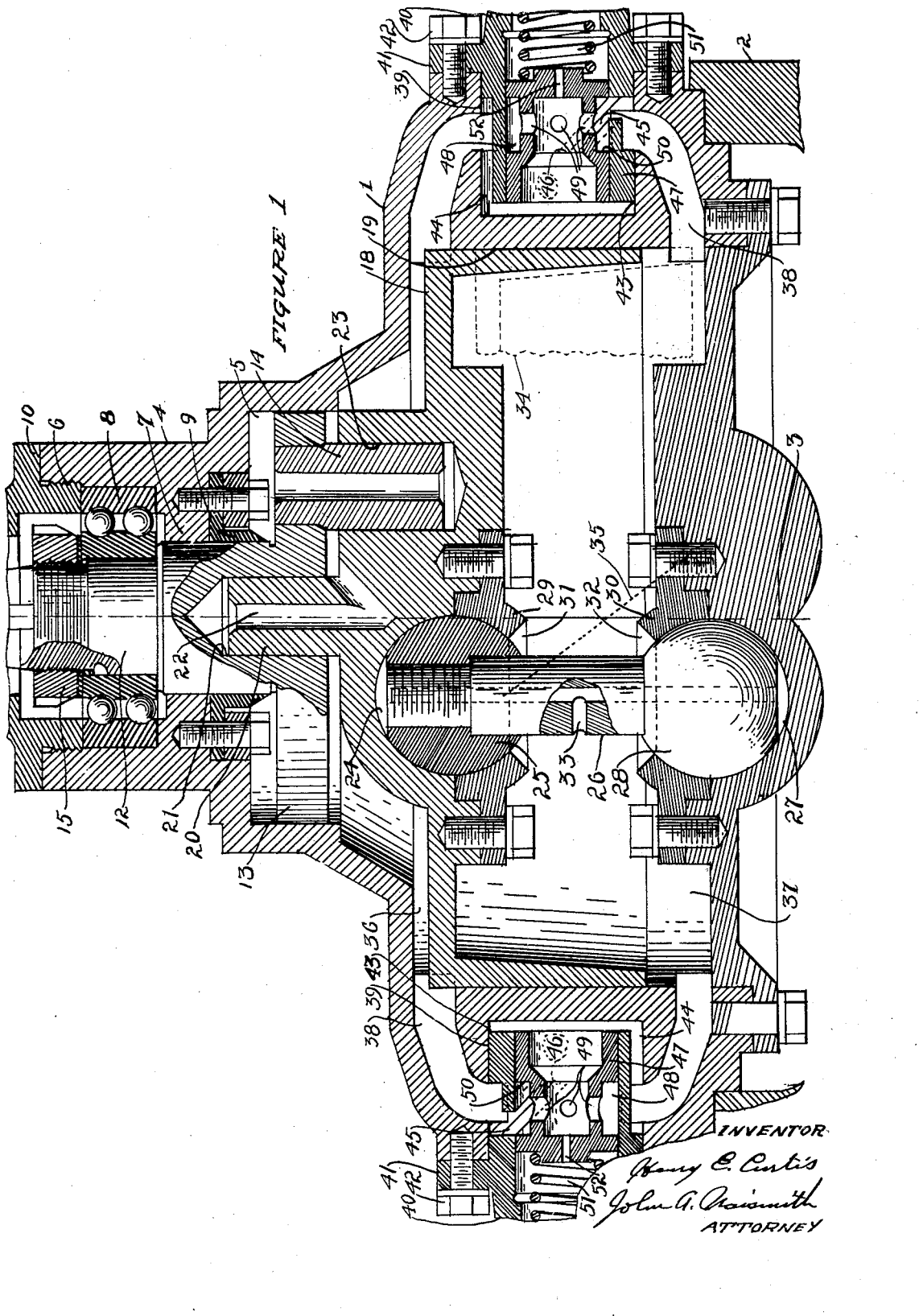
INVENTOR
Henry E. Curtis
John A. Graismith
ATTORNEY June 7, 1932.   H. E. CURTIS   1,861,909
POWER TRANSMISSION MECHANISM
Filed April 9, 1930    2 Sheets-Sheet 2
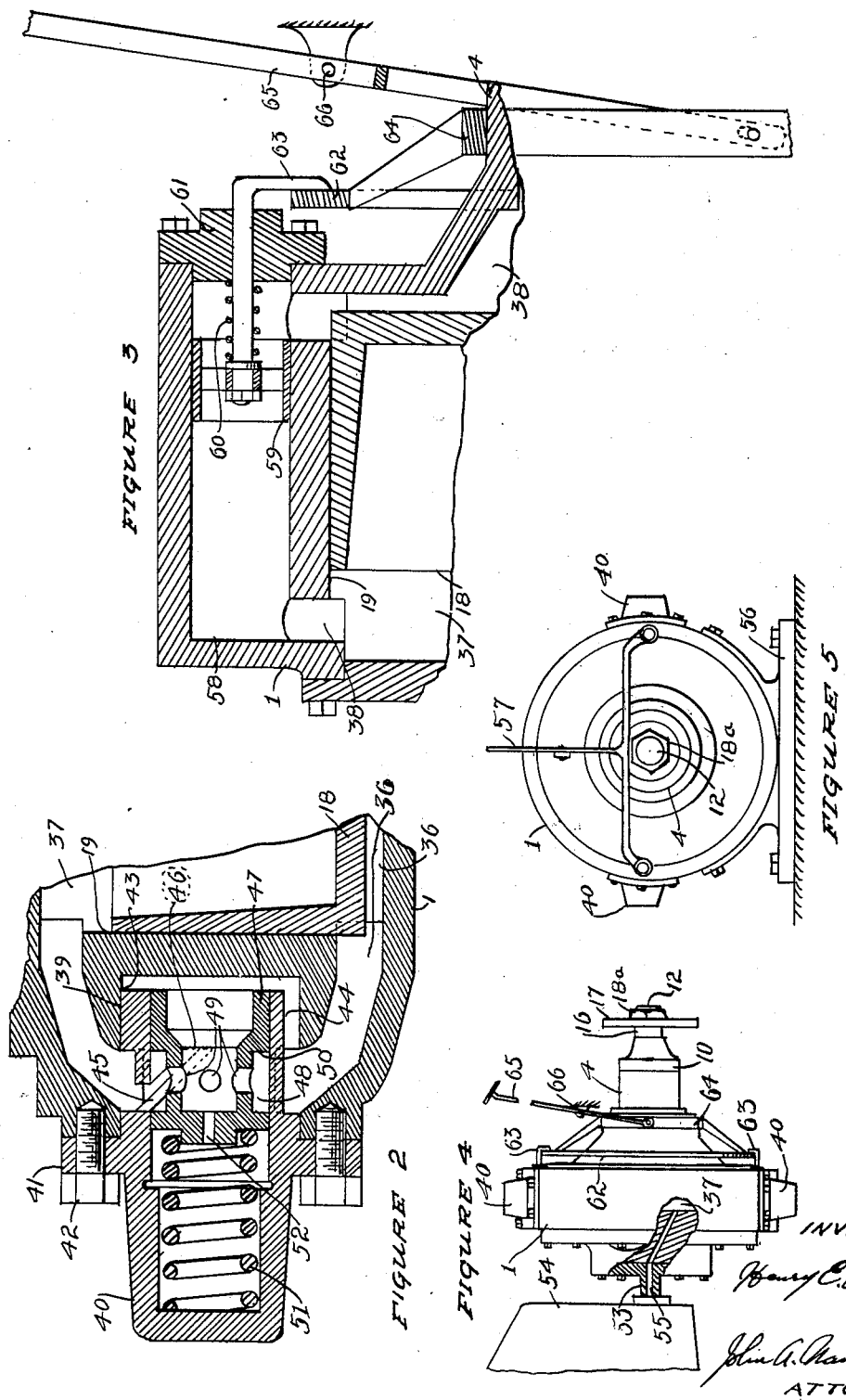

Patented June 7, 1932

1,861,909

UNITED STATES PATENT OFFICE

HENRY E. CURTIS, OF SAN JOSE, CALIFORNIA

POWER TRANSMISSION MECHANISM

Application filed April 9, 1930. Serial No. 442,902.

This invention relates particularly to a means for controlling the speed of rotation of a driven shaft relative to the speed of rotation of the driving means, reference being made to my copending application bearing Serial No. 417,991, filed Jan. 2, 1930.

It is one object of the invention to provide a means whereby the relative speeds of rotation of two shafts may be accurately and positively adjusted as desired without the manipulation of meshing gears.

It is also an object of the invention to provide a means of the character indicated wherein the speed of rotation of the driving shaft may be utilized for automatically determining the speed of rotation of the driven shaft.

It is also an object of the invention to provide a means of the character indicated whereby the speed variations may be graduated as finely as desired and effected without shock.

It is another object of the invention to provide a means of the character indicated wherein a fluid cushion may be utilized as the controlling factor in governing the speed of rotation of the driven shaft relative to the speed of rotation of the driving shaft.

It is still another object to provide a device of the character indicated that may be utilized as a brake or applied to marine or stationary engines, and that will be economical to manufacture, simple in form, construction and operation, positive and accurate in operation, small and compact, strong and durable, of few parts, and highly efficient in its practical application.

In the drawings:

Figure 1 is a section through a unit embodying one form of the invention, parts broken away.

Figure 2 is a detail section of the automatic valve.

Figure 3 is a detail section of another valve form.

Figure 4 is an elevation of one form of assembly when mounted to function as a fly-wheel, part broken away.

Figure 5 is an elevation of the device on a fixed base.

I show at 1 an annular housing mounted on fly-wheel 2, its axis of rotation being shown at 3.

On the side remote from the fly-wheel the housing 1 has a bearing or neck portion 4 forming a recess 5 and internally threaded on its outer end as 6 and provided with a flange 7 between recess 5 and end 6. Ball bearings 8 are mounted in the neck on the outer side of flange 7 and packing 9 on the inner side. A cap 10 is threaded into the outer end of the neck 4 as shown.

At 12 is shown a stub shaft mounted in bearings 8 and engaging packing 9, the inner end of the shaft having a flange 13 formed thereon and extending into recess 5, and the flange having a pin 14 mounted thereon and extending into the interior of housing 1 in parallel relation to axis 3.

The outer portion of the shaft is fitted with a nut 15 bearing against bearing 8 and passes through the cap 10 where it is fitted with a member 16 carrying a flange 17, and a nut 18a to secure the member 16 in place.

By means of the foregoing construction the housing 1 and the shaft 12, with the parts mounted thereon or connected thereto, may rotate freely with respect to each other and yet form a closed chamber for the reception of fluid.

In the housing 1 is mounted a piston 18, the piston being mounted to reciprocate on axis 3 and in the housing cylinder wall 19 and capable of a rotary motion with respect to the latter. The piston carries a pin 20 on its outer side engaging a bearing 21 in shaft 12, lubrication being effected by means of a passage as 22. The piston is also provided with a bearing at 23 to engage the pin 14 whereby the piston must rotate as a unit with shaft 12 but is also axially movable with respect thereto.

On the inner side of piston 18 and in eccentric relation to its axis of rotation is a spherical socket 24 in which is seated a ball member 25 on a connecting rod 26. A similar socket 27 is formed in the opposing wall of housing 1 to receive the ball member 28 on the other end of rod 26. These ball ends are held in place by caps as 29 and 30 provided with openings as 31 and 32 of such a size and shape as to permit the rod 26 to assume an angular position in any direction. Lubricating fluid is admitted to the ball ends through passage 33. The rod 26 is of such a length that it lies parallel with axis 3 when the piston reaches the end of its outward stroke.

The piston 18 is normally held against rotation by resistance applied to the shaft 12 as, for instance, the drive wheels and drive shaft and connecting parts of an automobile, consequently when the housing 1 is being rotated by the fly-wheel 2 and the ball end 28 is carried in a circular path about the axis 3 a rectilinear reciprocating movement only will be imparted to piston 18. The dotted line at 34 indicates the position of the piston when the ball end 28 has travelled half-way around the circle and carried the axis of the rod 26 into the position shown at 35.

Since the piston 18 divides the housing 1 into two chambers as 36 and 37 a rotary motion may be imparted to the piston in the following manner.

The chambers 36—37 are connected by conduits as at 38, and the chambers and conduits are filled with a suitable fluid as oil. Radially disposed in the perimeter of housing 1, and passing through each conduit, is a bore 39. At 40 is a valve housing provided with a flange 41 by means of which it may be mounted on housing 1 as at 42, the inner end of the housing extending to a point 43 spaced from the bottom of the bore. The housing has a passage 44 formed in one side thereof communicating with the adjacent portion of conduit 38 and the bottom of the bore 39, and an angularly disposed slot 45 formed in the opposite side and communicating with the other portion of the conduit 38 and extending inwardly to a point 46. A hollow valve 47 is slidably mounted in housing 40 and has an annular passage 48 formed in its outer periphery and communicating with its interior by orifices 49, the shoulder 50 normally aligning with the bottom of slot 45 under the pressure of spring 51. An orifice 52 connects the interiors of housing 40 and valve 47, the valve being open at its inner end.

Assuming now that the housing 1 is rotating at a low rate of speed, such as when the engine is idling, a rectilinear motion is imparted to the piston 18 as hereinbefore set forth, through the medium of connecting rod 26, and the oil in the housing flows back and forth between chambers 36—37 through conduits 38 and valve passages 44, 39, 49, 48 and 45. As the speed of rotation of the housing 1 increases, however, the centrifugal force generated thereby causes the valve 47 to move outwardly against the spring pressure at 51 thereby progressively reducing the flow of fluid through slot 45 and building up unequal fluid pressures in chambers 36—37, and consequently slowing down the rectilinear movement of the piston and imparting a rotary motion thereto. If the speed of rotation of the housing 1 is increased until the valves are actuated to close off the flow of fluid entirely then there is no rectilinear movement of the piston, but the entire energy of the rotating housing is expended in rotating the piston and the parts connected thereto, the whole rotating as a unit.

The structure may, of course, be mounted directly upon the shaft 53 of engine 54 in which case it functions also as a fly-wheel, as shown in Figure 4. In this case the chambers 36—37 are kept full of oil from the pressure oiling system of the engine through conduit 55.

In Figure 5 it is shown that the device may be mounted upon a fixed base as at 56 and used as a clutch as in marine or stationary engines, as a brake, and for other purposes, the valves being operated by a lever 57.

In Figures 1 and 2 an automatically operating valve 47 is shown, its movement rendered smooth and even by the restricted passage 52. A manually operated valve may be used, however, as shown in Figures 3 and 4, where a valve cylinder is provided at 58 as a portion of passage 37 and intermediate its ends. In this cylinder is a valve head 59 actuated in one direction by a spring 60 bearing thereagainst and against head 61, and in the opposite direction by a ring 62 engaging the end of rod 63 and mounted upon a bearing ring 64 on neck 4, the bearing ring having a sliding movement imparted thereto by means of a lever 65 pivoted on a fixed pivot as indicated at 66.

It is to be understood, of course, that while I have herein shown and described but one specific embodiment of the invention, changes in form, construction, and method of assembly and operation may be made within the scope of the appended claims.

I claim:

1. In mechanism of the character described, a rotatable driving member and a rotatable and reciprocating driven member, a connecting rod inserted between the members and having universal joint connections therewith, the members being disposed in axial alinement with each other and the connecting rod being disposed in eccentric relation to said members, whereby rotation of the driving member will impart rectilinear movement to the driven member in a direction axially of the driving member.

2. In combination, a rotatable housing, a driven member in said housing, a shaft having a radially extending part disposed in said housing, said shaft having an axially disposed recess, a bearing pin carried by said driven member and received in said recess, said driven member having a recess formed therein and disposed in parallel relation with respect to said bearing pin, a second bearing pin carried by said radially extending part and disposed in the last named recess, means connecting the housing and driven member and disposed in eccentric relation to the axis of rotation of the housing to impart a rotating and reciprocating movement to the driven member, and means for actuating the rotatable housing.

3. In mechanism of the character described, a fly wheel, a housing carried by said fly wheel and movable therewith, a rotatable and reciprocating piston in said housing, a fluid chamber on each side of the piston, a fluid passage connecting said chambers, a normally open valve carried by the housing and disposed in said passage, means between the piston and housing operable to impart a reciprocatory movement to the piston when the valve is open and the housing is rotated, said valve being adapted to close by centrifugal force to prevent the reciprocation of the piston and to permit rotation of the piston with the housing, and means to actuate said fly wheel.

HENRY E. CURTIS.